United States Patent [19]

Dillon

[11] Patent Number: 4,490,200
[45] Date of Patent: Dec. 25, 1984

[54] FLEXIBLE, NON-KINKABLE HOSE AND METHOD FOR MAKING THE SAME

[76] Inventor: Joseph C. Dillon, 12317 Rochedale La., Los Angeles, Calif. 90049

[21] Appl. No.: 539,072

[22] Filed: Oct. 4, 1983

Related U.S. Application Data

[62] Division of Ser. No. 365,361, Apr. 5, 1982, Pat. No. 4,420,019.

[51] Int. Cl.³ .............................................. F16L 11/11
[52] U.S. Cl. ..................................... 156/143; 156/195
[58] Field of Search ....................... 156/143, 144, 195; 138/122, 129, 150

[56] References Cited

U.S. PATENT DOCUMENTS

| | | | |
|---|---|---|---|
| 2,731,040 | 1/1956 | Warburton | 138/129 |
| 3,199,541 | 8/1965 | Richitelli | 138/129 |
| 3,273,600 | 9/1966 | Swan | 138/122 |
| 4,121,624 | 10/1978 | Chen | 138/122 |
| 4,375,381 | 3/1983 | Carlson | 156/195 |

*Primary Examiner*—David Simmons
*Attorney, Agent, or Firm*—Bruce A. Jagger

[57] ABSTRACT

A flexible hose wherein the majority of the mass and the strength are located at the radially outermost portion of the hose. The hose is constructed by combining a relatively rigid radially outermost cap with a relatively flexible inner membrane.

7 Claims, 6 Drawing Figures

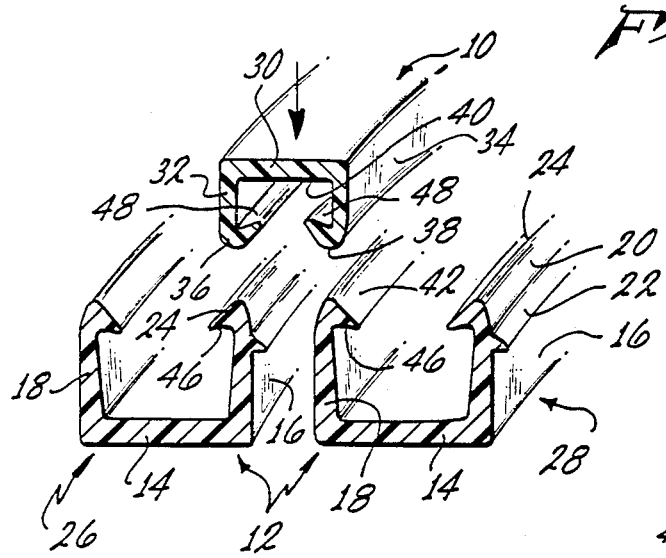
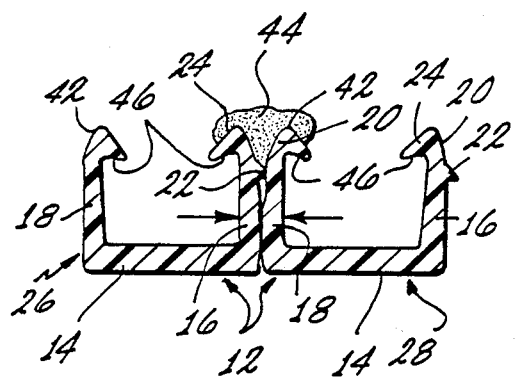
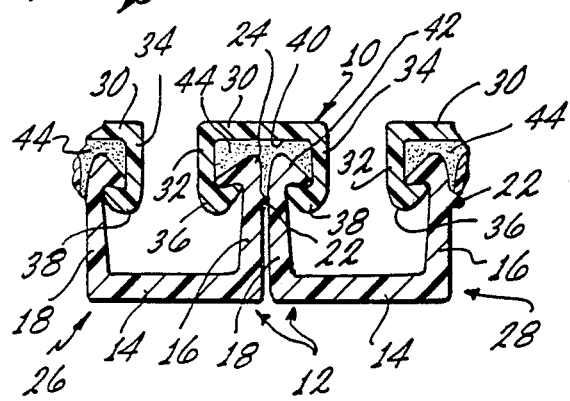
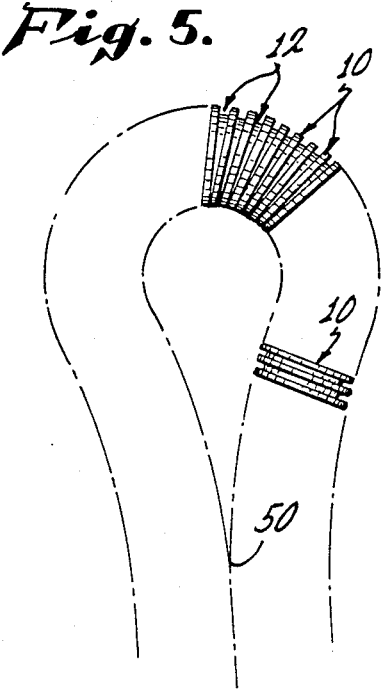
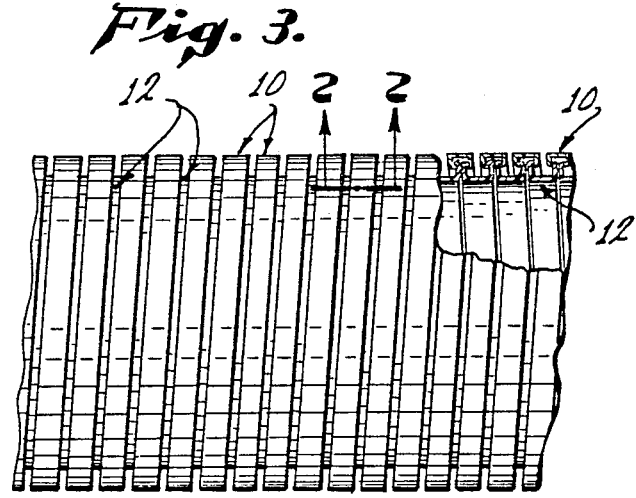

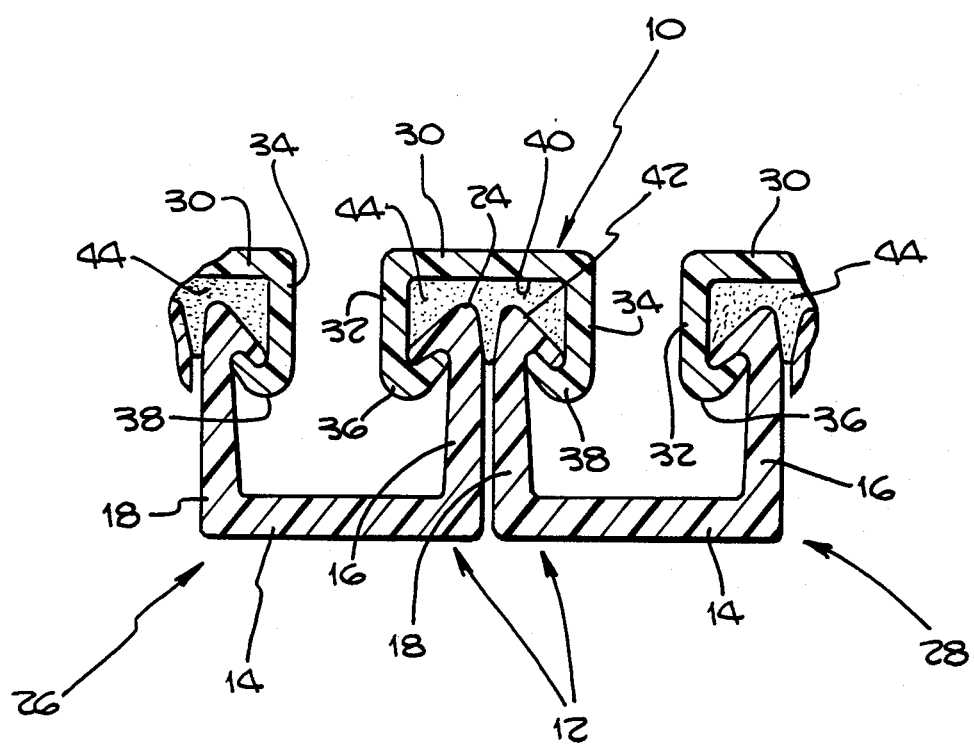

4,490,200

FLEXIBLE, NON-KINKABLE HOSE AND METHOD FOR MAKING THE SAME

This application is a divisional application of U.S. patent application, Ser. No. 365,361, filed Apr. 5, 1982, and now U.S. Pat. No. 4,420,019, issued Dec. 13, 1983.

BACKGROUND OF THE INVENTION

1. Field of the Invention

The present invention relates to the field of flexible hose and in particular relates to a vacuum hose and method for making the hose from spirally wound, flexible strips and in particular to vacuum hose which is assembled from strips which have differing characteristics.

2. Description of the Prior Art

Flexible hose, such as typically used in vacuum hose applications, must be characterized by a high hoop strength, great flexibility and high resistance to abrasion and collapse from kinking or sharp bends. Prior art hoses have been able to achieve some of these characteristics only at the expense of other characteristics.

For example, flexible hose has traditionally been made of a flexible material, such as plastic reinforced by steel wire to give it the required hoop strength. See for example Swan, "Flexible Tube", U.S. Pat. No. 3,273,600; Haren, "Hose and Method of Manufacture", Canadian Pat. No. 800,406; and Richitelli et. al., "Wire-Reinforced Helically Fabricated Flexible Conduit", U.S. Pat. No. 3,323,553.

Later, steel reinforcing wire was replaced by a plastic wire which was much thicker than the steel wire in order to obtain the required structural rigidity. Since the plastic wire required a much larger mass, various plastic, corrugated hoses have been devised. See, Hawerkamp, "Method of Making Continuous Corrugated Plastic Pipe", U.S. Pat. No. 3,477,891; Osborn, "Method of Making Corrugated Flexible Hose", U.S. Pat. No. 3,445,308; D'Onofrio, "Method for Forming a Helically Corrugated Concentric Tubing Unit", U.S. Pat. No. 3,777,343. However, in order to achieve the required flexibility, many of these corrugated pipes have sacrificed strength and tend to collapse or kink at sharp bends. Moreover, hose of a corrugated nature or having plastic wire for hoop strength often has the flexible membrane of the hose at the top of the crown or the exterior surface of the hose. As a result, the most vulnerable part of the hose is subjected to abrasion or puncture. Any attempt to increase the thickness, toughness or hardness of the membrane portion of the hose also reduces the flexibility of the hose. Some flexible, prior art hoses which have sufficient toughness to avoid puncture or abrasion also have the feel of rigid pipe.

To improve abrasion resistance and durability, various interlocking helical designs have been devised for flexible hose. A strip is configured such that it may be helically wrapped and each adjacent wrap bound to the adjoining wrap to form a sealed, cylindrical tube. Sealing by an adhesive or thermoplastic material normally leaves the sealed joint rigid. The flexibility of the hose is then attributed to the innerlying membrane between adjacent seals. See for example Squirrell, "Flexible Hose of Interlocking Helical Convolutions", U.S. Pat. No. 3,255,780; and Lykle, "Flexible and Extensible Hose", U.S. Pat. No. 3,542,078. However, each of these prior art structures sacrifice flexibility for durability or necessitated a complex structure which could be fabricated and sealed only with substantial difficulty or expense.

What is needed is a reliable, long-lived flexible hose construction which does not require an excessive amount of material, which is inexpensive to manufacture, which can be made of various substances, which can be simple in design, which is lightweight, which can be easily fabricated, which has high hoop strength, which is highly resistant to abrasion and yet maintains extreme flexibility without any tendency to collapse or kink on sharp bends.

BRIEF SUMMARY OF THE INVENTION

The present invention includes a flexible hose comprising a channel member having a generally U-shaped cross section with first and second walls integrally formed with a base. The first wall includes a rib integrally formed thereon which projects outwardly from said first wall and is disposed on said first wall proximate to that end of the first wall most distant from the base of channel member. The channel member is formed as a continuous strip and is spirally wound to generally form a cylindrical tube. The rib of the first wall is adjacent and contiguous to the second wall of an adjacently wound wrap of the sprially wound channel member. A cap or crown member which has a generally inverted U-shaped cross section with inwardly projecting flanges at the outer terminus of the legs is disposed on the spirally wound channel member. The first and second walls of the channel member are provided with inwardly projecting flanges adjacent to the ends of the respective walls which are remote from the base. The crown member is provided with inwardly projecting lips which are adapted to engage and interlock mechanically with the flanges on the channel members. The cap member encloses the first and second walls of adjacent wraps of the spirally wound channel member. The cap member is also spirally wound on the channel member and complimentarily conforms with the cylindrical tube formed by the spirally wound channel member. The cap member and adjacent wraps of the channel member are bound together within the inverted U-shaped cavity formed by the cap member by means of a solidified in situ binding material and the interlocking of the crown and channel members. By virtue of this combination flexible, lightweight, non-kinkable hose may be inexpensively and reliably manufactured whereby the rib disposed on the first wall prevents the binding material from flowing between adjacent first and second walls beyond the rib. Prevention of the flow of the binding material thus preserves the flexibility of the coupling between adjacent spiral wraps of the channel member since these adjacent walls are not bound together but remain separable. Therefore, the overall flexibility of the hose is preserved and further enhanced.

The present invention also includes a method for construction of flexible non-kinkable hose comprising the steps of forming a generally cylindrical tube by spirally wrapping a channel member. Again the channel member is formed of a continuous strip having a base portion integrally formed with a first and second wall. As described above the first wall has a rib integrally formed on the exterior surface thereof. The continuous rib runs the length of the channel member and is generally parallel to the base portion of the channel member, or equivalently to the upper edge of the first wall upon which the rib is formed. The rib is disposed on the exterior surface of the first wall below and proximate to the upper edge of the first wall. The second wall is integrally formed with the base portion and is disposed opposite the first wall to form the generally U-shaped cross section of the channel member in combination with the first wall and base portion. The continuous integral locking flanges also run the length of the channel member and extend parallel to the rib and the base on the interior surfaces of the respective walls. The channel member, as stated, is spirally wrapped so that the rib on the first wall is proximate to the exterior surface of the second wall of an adjacent wrap of the channel member. Thermosetting or thermoplastic initially flowable binding material is then disposed along the upper edge of the adjacent first and second walls of the spirally wrapped channel member. Alternatively, the binding material may be the molten upper edges of the walls. A cap member is then disposed on the adjacent first and second walls of adjacent wrappings while the binding material is still flowable. The binding material is then allowed to solidify in situ thereby binding the cap member and adjacent wraps of the channel member. When assembled according to this methodology, a non-kinkable lightweight flexible hose is easily and inexpensively fabricated in such a manner that the lower portions of the first and second walls below the rib are maintained free of the binding material thereby retaining their inherent expandable and flexible characteristic.

These and other characteristics of the present invention are better understood by reviewing the following figures, which are submitted for the purposes of illustration only and not limitation, whrein like elements are referenced by like numerals, in light of the detailed description of the preferred embodiments.

BRIEF DESCRIPTION OF THE DRAWINGS

FIG. 1 is an exploded sectional view of two spiral wraps of a channel member used in combination with a crown member to form, the flexible hose of the present invention;

FIG. 2 is a sectional view taken through lines 2—2 of FIG. 3 showing the formation of a double-walled I-beam between adjacent channel members when assembled with the corresponding crown member and binding material;

FIG. 3 is a partially cut away elevated view of an assembled hose formed according to the present invention.

FIG. 4 is a sectional view similar to FIG. 2 prior to the application of the crown member;

FIG. 5 is an elevated view of a completed structure showing the hose bent into an eyelet configuration around a small radius; and FIG. 6 is a sectional view similar to FIG. 2 showing an additional embodiment.

DETAILED DESCRIPTION OF THE PREFERRED EMBODIMENTS

The present invention includes a method and structure for a flexible hose wherein a continuous, helically wrapped channel member is combined with a complimentarily disposed and helically wrapped cap or crown member to form double-walled I-beams which serve as the flexible membrane of the hose wall. The double-walled I-beam is formed and adjacent wraps of the channel member are bound to the corresponding crown member by disposition of an initially flowable thermosetting or thermoplastic material or adhesive at the juncture of the crown member and top edges of adjacent wraps of the channel member. One wall of the channel member is provided with an integral rib running parallel to the upper edge of the channel member. The rib forms a barrier or dam to the flow of the binding material disposed in the juncture between the crown member and adjacent channel members. After the binding material solidifies in situ and forms the double I-beam structure with adjacent wraps of the channel member the walls of adjacent wraps are still separated which allows the flexibility inherent in the walls of the channel member, as well as its base, to the overall flexibility of the hose. The crown member forms a durable abrasion resistant covering for the exterior of the hose. These and other features of the present invention are best understood by considering the embodiment illustrated in FIGS. 1-3 in detail.

FIG. 1 is an exploded view of cap or crown member 10 and adjacent wraps 26 and 28 of channel member 12. Both crown member 10 and channel member 12 are formed as continuous strips according to conventional extrusion techniques. In the preferred embodiment, crown member 10 and channel member 12 are formed of a flexible or resilient material, such as a resinous or polymeric thermosetting or thermoplastic substance. However, it is entirely within the scope of the present invention that other flexible materials may be used as well.

Channel member 12 has a generally U-shaped cross section formed by a base portion 14 and two integrally formed walls, a first wall 16 and a second wall 18. First wall 16 also has a rib 22 integrally formed on its exterior surface 20 which rib runs the length of channel member 12 and is generally parallel to upper edge 24 of first wall 16 or equivalently to base portion 14 of channel member 12. Second wall 18 is integrally formed on the opposing side of base portion 14 and is identical to first wall 16 with the exception that second wall 18 has no rib 22 formed thereon. When sprially wrapped, as shown in exploded view in FIG. 1, first wall 16 of one wrap generally denoted by the reference numeral 26 is proximate or contiguous to second wall 18 of an adjacent wrap, generally denoted by reference numeral 28. As will be described in greater detail below, rib 22 and its contiguous or adjacent relationship to second wall 18 of an adjacent wrap 28 of channel member 12 materially assists the fabrication of and materially contributes to the utility of a flexible hose according to the present invention.

Also shown in exploded view of FIG. 1 is crown member 10 which is a continuous strip also formed by conventional extrusion techniques. Again, crown member 10 may be made of any flexible or resilient material, such as a resinous or polymeric thermosetting or thermoplastic material, and and preferably is compatible to the material of channel member 12. Crown member 10 has a generally inverted U-shaped cross section formed of a base portion 30 and two opposing walls 32 and 34. The lower edge of each wall 32 and 34 may also be provided with a lip 36 and 38, respectively, which projects inwardly into the inverted U-shaped cavity 40 of crown member 10 and aids in retaining the initially flowable binding material in the desired location. As suggested by the exploded view of FIG. 1, crown member 10 is disposed over adjacent walls of adjacent wrappings of channel member 12. As described in greater detail below, crown member 10 is disposed as shown in FIG. 2 such that first wall 16 of wrap 26 and second wall 18 of wrap 28 will be disposed within the inverted U-shaped cavity 40 formed by crown member 10. Crown member 10, and wraps 26 and 28 are bound together with an initially flowable binding material (not shown in FIG. 1), such as a thermosetting or thermoplastic material of a type which is compatible with that which forms channel member 12 and crown member 10.

FIG. 2 is a sectional view of the wall of a hose fabricated according to the present invention from the constituent elements shown in FIG. 1 together with binding material. The sectional view is taken through section 2—2 of the completed hose as indicated in FIG. 3. Wrap 26 of channel member 12 is shown in FIG. 2 as having first wall 16 integrally bonded to second wall 18 of wrap 28 within cavity 40 defined by crown member 10. Molten thermoplastic material or uncured thermosetting material is disposed within cavity 40 of crown member 10, or on the top edges 24 and 42 and proximate interior surfaces of first wall 16 and second wall 18. Crown member 10 and wraps 26 and 28 are then assembled as shown in FIG. 2 so that top edges 24 and 42 are disposed into cavity 40. The flowable binding material is retained in place by rib 22 by lips 36 and 38 and edges 24 and 42. The flowable binding material solidifies in situ leaving a solid body 44 within cavity 40 of crown member 10 which binds wraps 26 and 28 and crown member 10 together. The solidified in situ body together with edges 24 and 42 forms a solid "I" shaped head within cavity 40. While the binding material is still in the flowable state, rib 22 is in contact with the exterior surface of adjacent second wall 18 of the adjacent wrap thereby forming a barrier and preventing the flow of such binding material between first wall 16 and second wall 18 below rib 22. Lips 36 and 38 together with edges 24 and 42 serve a similar purpose to keep the binding material from flowing down the opposite sides of walls 16 and 18.

As a result, portions of first wall 16 and second wall 18 below rib 22 and lips 36 and 38 remain separable and flexible and can be exploited to contribute to the overall flexibility of the hose.

The resulting structure is in the shape of an I-beam having a double wall. In the case where the binding material is thermoplastic of a type like that of crown member 10 and channel member 12, immediate portions of channel member 12 or crown member 10 or both, actually merge and form an integral structure at their juncture when these immediately contiguous portions are turned into the plastic state and merge with the binding material, later to solidify or cure into an integral mass. Where the members are thermoplastic they can be joined by melting those portions of the members which are to be joined and allowing them to flow together. For example, the edges 24 and 42 may be melted to form binding material. Crown member 10 and edges 24 and 42 have been illustrated in FIG. 2 as remaining separate structures for the purposes of clarity to emphasize the formation of an I-beam shape from channel member 12. Preferably, crown member 10 is rendered integral with the structure by bonding with the binding material. Further, although rib 22 has also been shown as merged into mass 44, it may happen during fabrication that rib 22 is sufficiently distant from the binding material so that binding material does not flow into contact with rib. In this circumstance rib 22 remains as a separate, semirigid barrier to any additional flow or creep of the binding material between first and second walls 16 and 18.

Flexibility of a hose constructed according to the present invention is accomplished without creating any substantial discontinuities in the internal surface of the hose for several reasons including maintenance and sanitation it is generally undesirable to have gaps between adjacent wraps 26 and 28 in the completed structure. Flexibility in all necessary modes is achieved without permitting significant gaps between adjacent wraps. This is at least in part due to flexure of both base 14 and walls 16 and 18.

The fabrication of the completed hose as shown in FIG. 3 may now be understood when viewed in the light of the detailed construction of FIGS. 1 and 2. Channel member 12, which is a continuous strip, is spirally wound on a form such that each wrap is touching each adjacent wrap. Therefore, each wrap 26 has its rib 22 in contact with the adjacent wall 18 of the next wrap 28. Similarly, wrap 28 will have its rib 22 in contact with the adjacent wall of the next succeeding wrap. In a first embodiment, a binding material is coated upon top edges 42 of each of the wraps, such as by rotating edges 42 against a contact roller fed with a layer of binding material according to techniques well known to the art. In the case where the binding material is a thermoplastic melt or is formed by melting top edges 42, the contact roller is heated to maintain the thermoplastic material at the appropriate temperature until the hose is assembled. While the binding material is still flowable, crown member 10 is complimentarily disposed on edges 24 and 42 by threading the continuous strip of crown member 10 onto the exposed edges. Shortly thereafter, the binding material solidifies leaving the complete bond as shown in FIG. 2.

In a second embodiment, channel member 12 is spirally wrapped on a form as before. The binding material is then inserted or squirted through a small applicating tube into cavity 40 of crown member 10 just before crown member 10 is complimentarily threaded upon top edges 24 and 42 of spirally wrapped channel member 12. As crown member 10 is threaded upon edges 24 and 42 of channel member 12, the upper portion of wall 16 and 18 are disposed into cavity 40 forcing the binding material between walls 16 and 18 and squeezing the binding material over edges 24 and 42. However, lips 36 and 38 together with edges 24 and 42, as previously described, serve as additional barriers to prevent the loss of the binding material from cavity 40, resulting in a mass 44 solidifying in situ as illustrated in FIG. 2. Once the binding material has cooled, as in the case of a thermoplastic material, or has cured, as in the case of a thermosetting material, the completed hose is removed from the form and is ready for use without further processing.

During construction of the hose structure it is preferred that the walls 16 and 18, above rib 22 be caused to spread apart during the application of the initially flowable binding material as shown for example, in FIG. 4. This spreading or spacing apart to form a crevice between the adjacent walls is caused to occur, for example, by applying force to the interior surfaces of walls 16 and 18 as shown by the arrows in FIG. 4. This allows the binding material to flow into the resultant crevice and into contact with the exterior surfaces of walls 16 and 18 thus greatly increasing the strength of the bond between adjacent wraps 26 and 28.

The edges 24 and 42 are provided with crown engaging ledges 46 which are adapted to interengage and locks with locking rails 48 on crown 10. The mechanical locks provided by the interengagement of ledges 46 with rails 48 is in addition to the bond formed by mass 44 between the channel members and the crown member. Enlarged edges 24 and 42 serve to fill cavity 40, thus minimizing the amount of binding material which is required. The time which is required for mass 44 to solidify is reduced by minimizing the amount of binding material. Shortening the solidifying time increases the production rate.

Preferably spiral wraps 26 and 28 may be wound so tightly that rib 22 of wrap 26 actually firmly contacts second wall 18 of an adjacent wrap 28 and thereby forms a seal or dam to the flow of any binding material below rib 22. However, if the viscosity of the binding material is high enough or the curing time short enough or both, rib 22 of wrap 26 need not firmly contact wall 18 of wrap 28 to prevent the flow of the binding material between walls 16 and 18.

What results is a flexible hose which exhibits a high degree of flexibility due to the fact that both base portion 14 and substantial portions of walls 16 and 18 may be flexed and bent and not merely base proportion 18 as is typically the case in the prior art and as would be the case if binding material were permitted to flow below rib 22. In fact, as much as two thirds of the degree of flexibility of the hose of the present invention may be contributed by the flexure of walls 16 and 18.

Crown member 10 is supported by mass 44 thereby providing a thick, rigid, durable and abrasive resistant covering for the somewhat more delicate underlying membrance formed by channel member 12. Furthermore, inasmuch as crown member 10 is a separable part of the hose construction of the present invention, the substance from which crown member 10 may be made can be arbitrarily varied according to design choice to produce a hose which is particularly adapted for use in differing environments. For example, in one case crown member 10 may be made of a highly abrasion resistant and rigid material where the hose is to be used on rough surfaces. This is made possible inasmuch as a flexibility of the hose does not depend in any significant part upon flexibility of crown member 10. For example, crown member 10 could be metallic. In other applications, crown member 10 may be made of a particularly radiation resistant or chemically resistant covering such as would be useful in automotive applications where exposure to sunlight or ozone might otherwise dramatically shorten its lifetime.

Furthermore, crown member 10 has a square cross sectional base 30 and as stated may be made of relatively rigid material so that when the hose is flexed, walls 32 and 34 of adjacent wrappings of crown member 10 are compressed, but are not crushed by the bending of the hose. Instead, substantially the entire flexure of the hose is supplied by channel member 12 and in particular by flexure on that side of the hose which is under extension or tension. Since the compressed side of the bent hose is very resistant to being crushed, collapse of the hose at a sharp bend through an arc of more than 180 degrees is prohibited. As the hose continues to bend, it simply continues to flex on the extended side of the bend up to the point of the maximum extension of the tensioned side. Therefore, the hose may be bent through a 360 degree bend without collapse. In fact, the tensile strength of channel member 12, which is extremely high, may be exceeded on the tensioned side of a bend before the hose will crush on the compressed side of the bend.

For example, a typical hose constructed of thermoplastic materials according to the present invention with an inside diameter of about 1.5 inches and a wall thickness of about 0.19 inches can be bent into a helical form the inner radius of which is less than 1.5 inches without any rises of crushing. Thus, hose constructed according to this invention can be bent through an arc, the radius of which is less than the diameter of the cross section of the hose, without crushing the hose. This hose has a weight of only 0.26 pounds per foot. As another measure of the crush resistance a fifteen inch length of this 1.5 inch inside diameter hose can be bent around an arc such that the two ends are touching and extending parallel to one another without crushing the hose. This is illustrated particularly in FIG. 5 where the point at which the hose touches itself is indicated at 50.

Generally structures according to the present invention have cylindrical configurations, however, configurations such as conical or other variable diameter shapes are also contemplated.

The continuous membrane is protected from abrasion and puncture by the mass of the material which is used to join the spiral wraps 26 and 28 as well as by the crown 10. A large proportion of the mass and strength of the structure is adjacent to the outer diameter of the hose. Flexure takes place almost exclusively in the softer more pliable channel members.

The very high hoop strength of this structure permits it to be used with very high vacuums, such as for example, 29 inches of mercury. This structure strongly resists crushing from exterior forces such as heavy objects and hydraulic pressure. In addition to conventional vacuum hose applications these structures find application, for example, in sea bed mining, mine venting applications, and the like.

The structure according to this invention flexes primarily in the long sections of the base and walls of the channel member and not in the crown or in the corners of the channel. Confirming the majority of the flexure to the long walls and base of the channel member prevents the concentration of forces in any small areas which might crack, separates the flexing portion of the structure from the regions of heaviest wear and permits the crown to be constructed of a more rigid wear resistant stronger material.

Strength and flexibility are both achieved within one structure according to the present invention by using a relatively rigid material for the crown and a relatively flexible material for the channels. For example, the crown material can have a secant modulus of from about 50,000 to 120,000 pounds per square inch and the channels of from about 3,000 to 40,000 pounds per square inch. The relatively rigid material is used for the crown without sacrificing flexibility.

In the preferred embodiment a rib is provided to act as a barrier or dam to the flow of binding material between adjacent wraps. In an additional embodiment, illustrated in FIG. 6, it is possible to produce the hose without such a rib. The rate and amount of binding material must be carefully and accurately controlled so as to avoid a condition where binding material flows too far between adjacent wraps, thus impairing the flexibility of the structure. When no rib is present the adjacent wraps should be separated slightly at the location which is proximate to the outer edges of the walls to allow the adhesive to flow therebetween. In general the flexibility of the hose is decreased when the rib is not present.

It must be understood that many alterations and modifications may be made by those having ordinary skill in the art to both the structure and method of fabrication of the present invention without departing from the spirit and scope of the invention. Therefore, the presently illustrated embodiment has been shown only by way of example and for the purposes of clarity and should not be taken to limit the scope of the following claims.

I claim:

1. A method for the construction of flexible hose comprising the steps of:

forming a generally annular configuration by helically wrapping a flexible channel member, said channel member forming a continuous strip having a base portion integrally formed with a first and a second wall, said first and second walls having upper edges distal from said base portion, said first wall having a rib integrally formed on an exterior surface thereof, said rib running the length of said channel member and generally parallel to said base portion, said rib disposed on said exterior surface of said first wall proximate to said upper edge of said first wall, said second wall integrally formed with said base portion opposite said first wall, said first and second walls together with said base portion forming a generally U-shaped cross section channel member, helically wrapping said channel member so that said rib of said first wall is in contact with the exterior surface of said second wall of an adjacent wrap of said channel member;

providing an initially flowable binding material on said upper edges of adjacent first and second walls of said helically wrapped channel member;

disposing a cap member on said adjacent upper edges of adjacent wrappings of said channel member while said binding material is still flowable; and allowing said binding material to solidify in situ to bind said cap member and adjacent wraps of said channel member together, whereby a flexible hose may be easily fabricated in such a manner that lower portions of said first and second walls below said rib are maintained free of said binding material thereby retaining the expandable and flexible characteristics of said channel member.

2. The method of claim 1 wherein said channel member and cap member are of thermoplastic material and said binding material is of compatible thermoplastic material, said step of providing said binding material on said adjacent channel members including the step of disposing said binding material while in a heated thermoplastic state thereby causing immediately adjacent portions of said channel member and cap member to soften and integrally merge and bind with said binding material and thereby forming an integral composite structure.

3. The method of claim 1 where said step of providing said binding material on said upper edges of said adjacent first and second walls includes separating the radial extremities of said adjacent first and second walls to form a binding material receiving crevice while maintaining said first and second walls in contact with one another immediately adjacent to said radial extremities thereby restricting the flow of said binding material past said radial extremities.

4. A method for forming flexible hose comprising the steps of:

helically wrapping a channel member having radially extending walls, a radially extending wall of one wrap of said channel member being disposed adjacent to a radially extending wall of an adjacent wrap of said channel member;

selecting a crown member having a continuous inverted cavity;

wrapping said crown member around said channel member with the radial extremities of adjacent walls received in said cavity;

providing an initially flowable binding material to said cavity and between said radial extremities of adjacent walls to bind said radial extremities together and to bind said radial extremities to said crown member;

limiting the flow of said flowable binding material between said radial extremities of adjacent walls to a region proximate to said radial extremities; and allowing said binding material to solidify in situ to form a flexible hose having a helically wound double walled I-beam cross section wherein said crown member and radial extremities being bound together into a solid body in said region and said adjacent walls radially inwardly from said region being separable and flexible without significant flexing of said crown member.

5. Method of claim 4 including fusing said radial extremities to provide said initially flowable binding material.

6. Method of claim 4 including selecting a crown member formed from a material which is different from the material of which said channel member is formed.

7. The method of claim 4 wherein said channel member and said crown member include interlocking elements and said step of wrapping said crown member includes mechanically interlocking said crown member and said adjacent first and second walls proximate to said radial extremities.

* * * * *